(12) United States Patent
Paek et al.

(10) Patent No.: US 7,532,299 B2
(45) Date of Patent: May 12, 2009

(54) METHOD OF FABRICATING A LIQUID CRYSTAL DISPLAY DEVICE HAVING COLUMN SPACERS AND OVERCOAT LAYER FORMED BY DOUBLE EXPOSURE

(75) Inventors: Seung-Han Paek, Incheon (KR);
Yong-Jin Cho, Seoul (KR); Jung-Il Lee, Seoul (KR); See-Hwa Jeong, Annyang-si (KR)

(73) Assignee: LG Display Co., Ltd., Seoul (KR)

( * ) Notice: Subject to any disclaimer, the term of this patent is extended or adjusted under 35 U.S.C. 154(b) by 21 days.

(21) Appl. No.: 11/020,222

(22) Filed: Dec. 27, 2004

(65) Prior Publication Data
US 2005/0140915 A1    Jun. 30, 2005

(30) Foreign Application Priority Data
Dec. 27, 2003    (KR) .................. 10-2003-0098141

(51) Int. Cl.
*G02F 1/1335* (2006.01)
*G02F 1/1339* (2006.01)
*G02F 1/13* (2006.01)

(52) U.S. Cl. .................. 349/187; 349/122; 349/138; 349/155; 349/156

(58) Field of Classification Search .............. 349/155, 349/156, 106, 187
See application file for complete search history.

(56) References Cited

U.S. PATENT DOCUMENTS

| | | | |
|---|---|---|---|
| 6,429,916 B1 * | 8/2002 | Nakata et al. | 349/106 |
| 6,577,374 B1 * | 6/2003 | Nakata et al. | 349/156 |
| 6,690,445 B2 * | 2/2004 | Matsumoto | 349/155 |
| 6,812,990 B1 * | 11/2004 | Hofmann et al. | 349/156 |
| 7,023,021 B2 * | 4/2006 | Yamazaki et al. | 257/98 |
| 2003/0218703 A1 * | 11/2003 | Huh et al. | 349/106 |
| 2005/0117082 A1 * | 6/2005 | Tanaka et al. | 349/44 |

OTHER PUBLICATIONS

James F. Scott et al.; "Ferroelectric Memories"; Science, New Series, vol. 246, No. 4936 (Dec. 15, 1989) pp. 1400-1405.

* cited by examiner

*Primary Examiner*—Andrew Schechter
*Assistant Examiner*—Nathanael R Briggs
(74) *Attorney, Agent, or Firm*—McKenna Long & Aldridge LLP

(57) ABSTRACT

A method for fabrication a substrate for a liquid crystal display device includes: forming a color filter layer on a substrate; coating an organic layer on the color filter layer; irradiating a first light onto the organic layer; irradiating a second light onto the organic layer through a mask having a transmitting portion and a shielding portion, an energy density of the first light smaller than an energy density of the second light; and forming an overcoat layer and a column spacer by developing the organic layer.

14 Claims, 12 Drawing Sheets

METHOD OF FABRICATING A LIQUID CRYSTAL DISPLAY DEVICE HAVING COLUMN SPACERS AND OVERCOAT LAYER FORMED BY DOUBLE EXPOSURE

The present invention claims the benefit of Korean Patent Application No. 2003-98141, filed in Korea on Dec. 27, 2003, which is hereby incorporated by reference for all purposes as if fully set forth herein.

BACKGROUND OF THE INVENTION

1. Field of the Invention

The present invention relates to a liquid crystal display device, and more particularly, to a liquid crystal display device having column spacers and a method of fabricating a liquid crystal display device having column spacers.

2. Discussion of the Related Art

In general, a liquid crystal display (LCD) device makes use of optical anisotropy and polarization properties of liquid crystal molecules. The liquid crystal molecules have an orientation alignment that results from their long thin shape. The orientation of the liquid crystal molecules can be controlled by application of an electric field to the liquid crystal molecules. Accordingly, as an intensity of the applied electric field changes, the orientation of the liquid crystal molecules also changes. Since incident light passing through a liquid crystal material is refracted due to an orientation of the liquid crystal molecules resulting from the optical anisotropy of the aligned liquid crystal molecules, an intensity of the incident light can be controlled and images can be displayed.

FIG. 1 a schematic view of a related art LCD device.

In FIG. 1, the LCD device 11 includes upper and lower substrates 5 and 22. A black matrix 6, a color filter 8 having red, green and blue sub-color filters, and a common electrode 18 disposed above the color filter 8, are formed on the upper substrate 5. A pixel region P is defined in the upper and lower substrates 5 and 22, and a pixel electrode 17 is disposed on the pixel region P. In addition, an array structure, which includes a thin film transistor T, is formed on the lower substrate 22. A liquid crystal layer 14 is interposed between the upper and lower substrates 5 and 22.

The lower substrate 22 is commonly referred to as an array substrate, where thin film transistors T are arranged in a matrix configuration, and gate and data lines 13 and is that cross each other are formed, with the thin film transistors T located near the crossings. The pixel region P is defined by the gate and data lines 13 and 15, and a transparent conductive material such as indium-tin-oxide (ITO) having a relatively high transmittance is used as the pixel electrode 17 on the pixel region P. A storage capacitor $C_{ST}$ is formed on the gate line 13 and is connected to the pixel electrode 17 in parallel. At this time, a portion of the gate line 13 is utilized as a first electrode of the storage capacitor $C_{ST}$, and a second electrode 30 of the storage capacitor $C_{ST}$ is formed by using the same layer and the same material as the data line 15. A signal of the pixel electrode 17 is applied to the second electrode 30 of the storage capacitor $C_{ST}$, which is electrically connected to the pixel electrode 17.

The LCD further includes a column spacer (not shown) between the upper and lower substrates 5 and 22 in order to maintain a cell gap that is defined as a thickness of the liquid crystal layer 14.

FIG. 2 is a cross-sectional view illustrating an LCD device having a column spacer according to the related art.

In FIG. 2, a black matrix 220 having an open portion 225 is formed on a substrate 210. The open portion 225 includes first to third sub-open portions 225a, 225b and 225c. Although not shown, the substrate 210 includes a pixel region having red, green and blue sub-pixel regions, and each of the first to third sub-open portions 225a, 225b and 225c corresponds to each of the red, green and blue sub-pixel regions.

A color filter layer 230 is formed on the black matrix 220. The color filter layer 230 includes red, green and blue sub-color filters 230a, 230b and 230c. Each of the red, green and blue sub-color filters 230a, 230b and 230c corresponds to each of the first to third sub-open portions 225a, 225b and 225c.

In addition, an overcoat layer 240 is formed on an entire surface of the color filter layer 230 in order to planarizes the substrate 210 having the color filter layer 230, and a plurality of column spacers 250 are formed on the overcoat layer 240 in order to maintain a cell gap between the substrate 210 and the other substrate (not shown).

This substrate for the LCD device according to the related art requires a plurality of mask processes to be manufactured. Hereinafter, a method of fabricating a substrate for a liquid crystal display device according to the related art will be explained with reference to accompanying drawings.

FIGS. 3A to 3G are cross-sectional views illustrating a method for fabricating a substrate for a liquid crystal display device according to the related art.

In FIG. 3A, a black matrix 220 is formed by coating a light shielding material layer on a substrate 210 and by patterning the light shielding material using a patterning process such as a mask process, which includes exposure and developing processes. The black matrix 220 having first to third sub-open portions 225a, 225b and 225c are formed by the patterning process. Next, the black matrix 220 is subject to a heat treatment for curing. Although not shown, the first to third sub-open portions 225a, 225b and 225c correspond to red, green and blue sub-pixel regions, respectively, and the black matrix 220 is located in a non-pixel region surrounding the pixel region.

Next, in FIG. 3B, a red color resin 229 is coated over the substrate 210 having the black matrix 220. The red color resin 229 is selected from photosensitive materials.

In FIG. 3C, the red color resin layer 229 is patterned into a red sub-color filter 230a in the first sub-open portion 225a, and then is subject to a heat treatment for curing. The patterning step for the red sub-color filter 230a is a mask process, which includes exposure and developing processes.

Next, in FIG. 3D, a green sub-color filter 230b is formed in the second sub-open portion 225b by coating a green resin material layer and pattering the green resin material layer using a mask process.

In FIG. 3E, a blue sub-color filter 230c is formed in the third sub-open portion 225c by coating a blue resin material layer and patterning the blue resin material layer using a mask process. The red, green and blue sub-color filters 230a, 230b and 230c constitute a color filter layer 230.

In FIG. 3F, an overcoat layer 240 is formed by coating a transparent organic material on an entire surface of the color filter layer 230 and by patterning the transparent organic material layer. Next, the overcoat layer 240 is also subject to a heat treatment for curing.

Meanwhile, because a sealant (not shown) for attaching two substrates (upper and lower substrates) is located along edges of the substrate 210, a mask process for the overcoat layer 240 is added to form the overcoat layer 240 inside the sealant.

Next, in FIG. 3G, a plurality of column spacers 250 are formed by coating a photosensitive organic material on the overcoat layer 240 and by patterning the photosensitive organic material layer using a mask process. Next, a heat treatment is performed to cure the column spacer 250.

As explained process above, a method for fabricating the LCD device according to the related art is formed by coating, exposure, developing and curing processes to form the black matrix, the color filter layer, the overcoat layer and the column spacers. Therefore, the number of process steps for fabricating the LCD device becomes high. Specifically, as the number of mask steps increases, the production cost increases. Moreover, it raises such problems as device defects, low production yield, and the like.

SUMMARY OF THE INVENTION

Accordingly, the present invention is directed to a liquid crystal display device having column spacers and a method of fabricating a liquid crystal display device having column spacers that substantially obviate one or more of the problems due to limitations and disadvantages of the related art.

An advantage of the present invention is to provide a method of fabricating a liquid crystal display device that can reduce the production cost by reducing the number of process steps.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for fabrication a substrate for a liquid crystal display device includes forming a color filter layer on a substrate; coating an organic layer on the color filter layer; irradiating a first light onto the organic layer; irradiating a second light onto the organic layer through a mask having a transmitting portion and a shielding portion, an energy density of the first light smaller than an energy density of the second light; and forming an overcoat layer and a column spacer by developing the organic layer.

In another aspect, a liquid crystal display device includes: first and second substrates; a color filter layer on the second substrate; an overcoat layer on the color filter layer; and a column spacer on the overcoat layer, the column spacer and the overcoat layer formed as a single body; and a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the embodiment of the present invention, an example of which is illustrated in the accompanying drawings.

According to the present invention, a plurality of column spacers and an overcoat layer can be substantially formed simultaneously in the same process. Therefore, the number of mask steps for fabricating a liquid crystal display device having the column spacers can be reduced.

Figure 1:
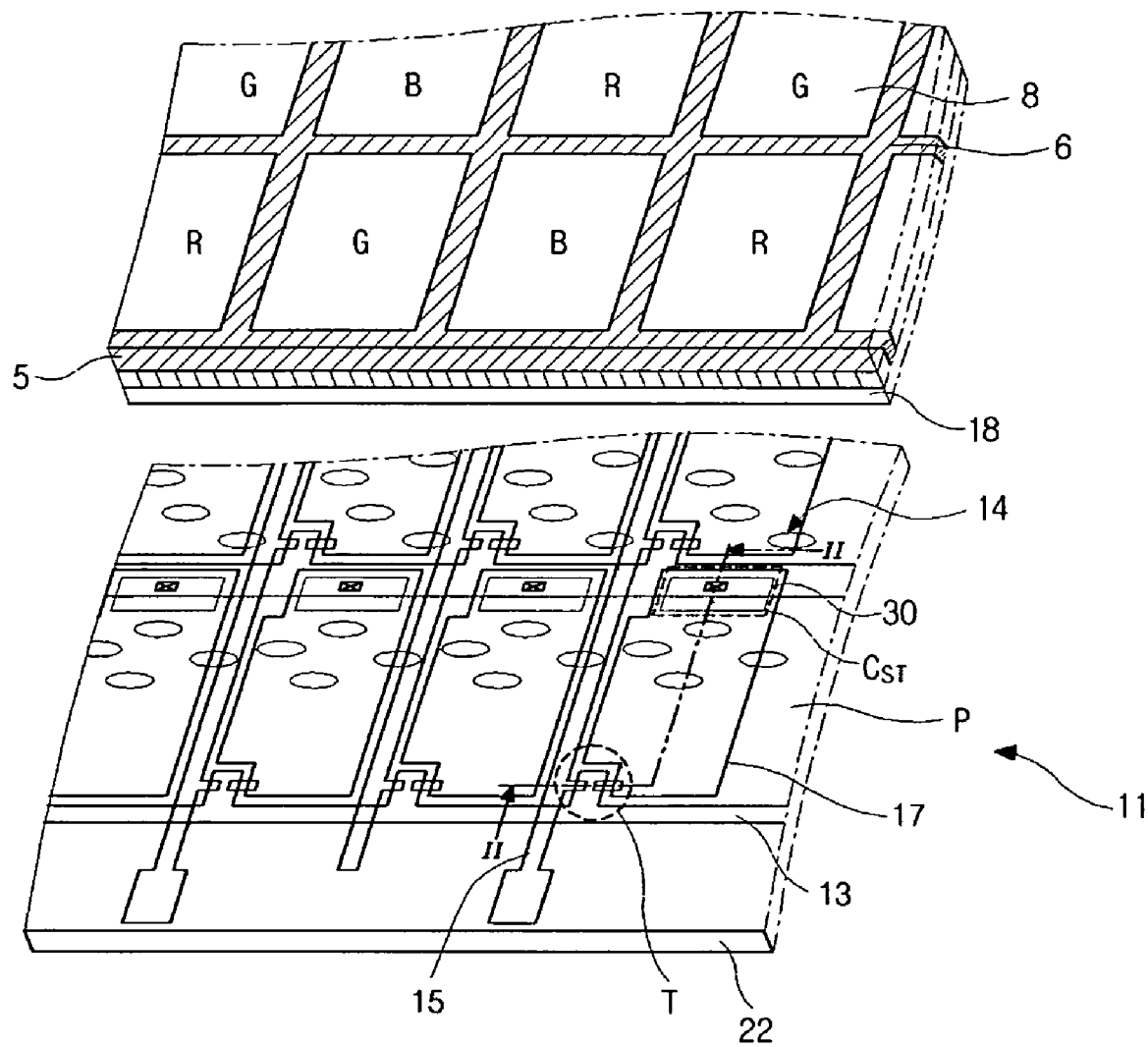
FIG. 1 a schematic view of a related art LCD device.
Figure 2:
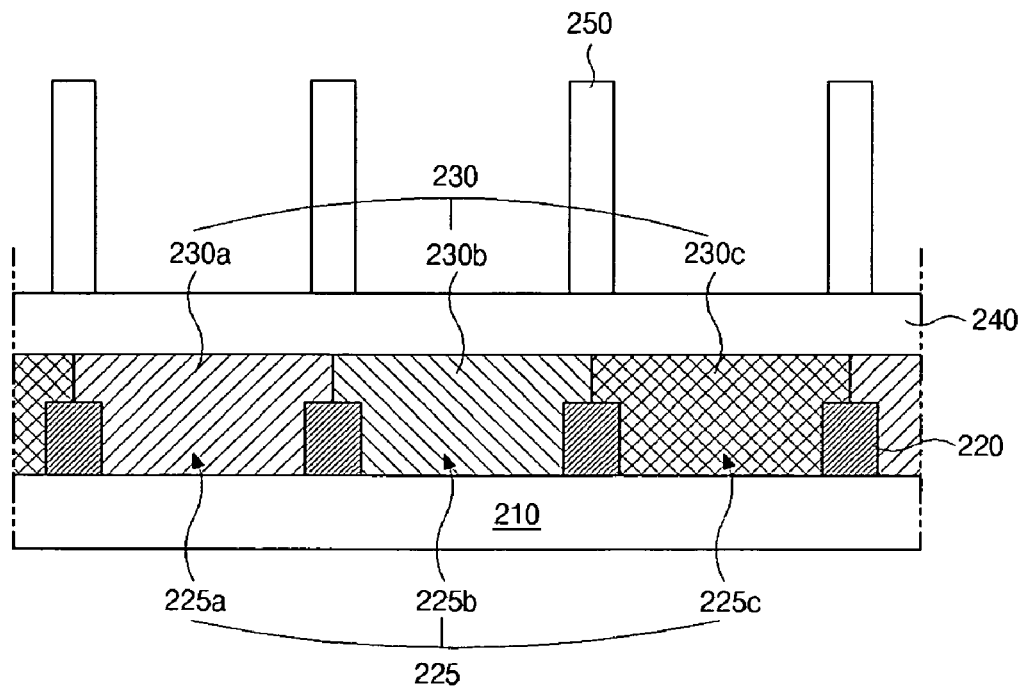
FIG. 2 is a cross-sectional view illustrating an LCD device having a column spacer according to the related art.
Figure 3A:
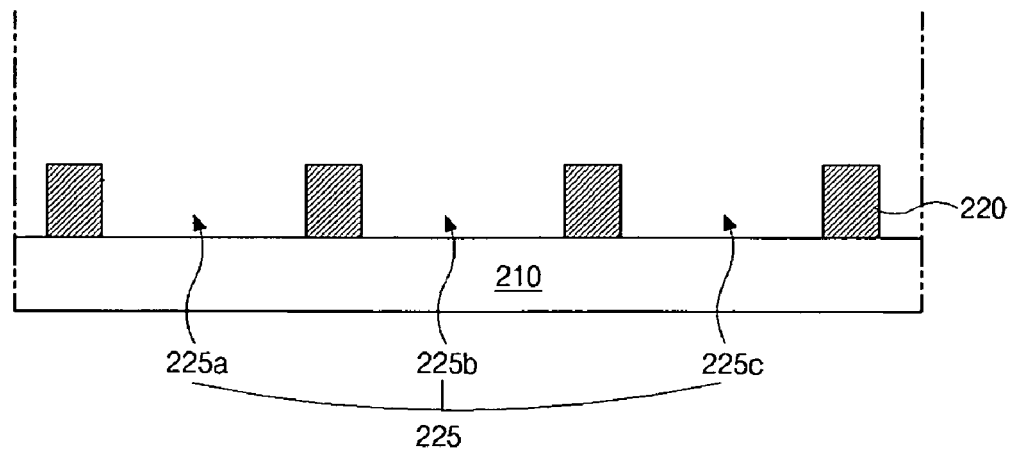
FIGS. 3A to 3G are cross-sectional views illustrating a method for fabricating a substrate for a liquid crystal display device according to the related art.
Figure 3B:
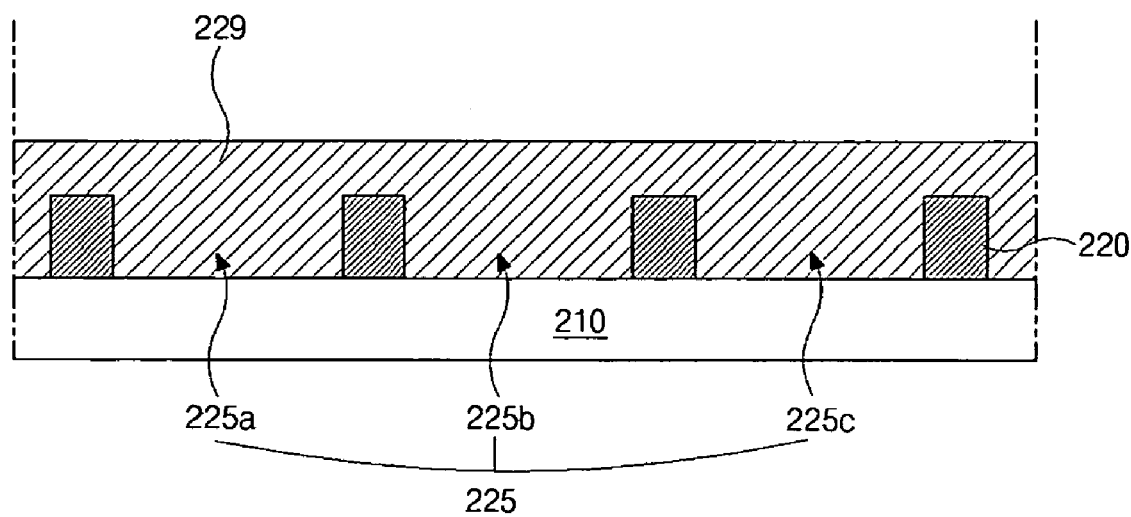
Figure 3C:
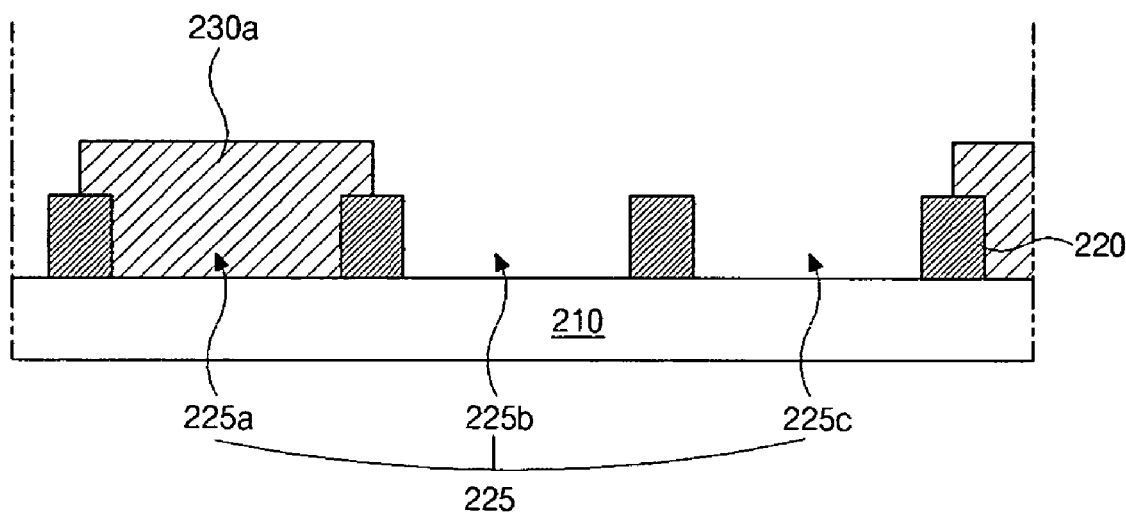
Figure 3D:
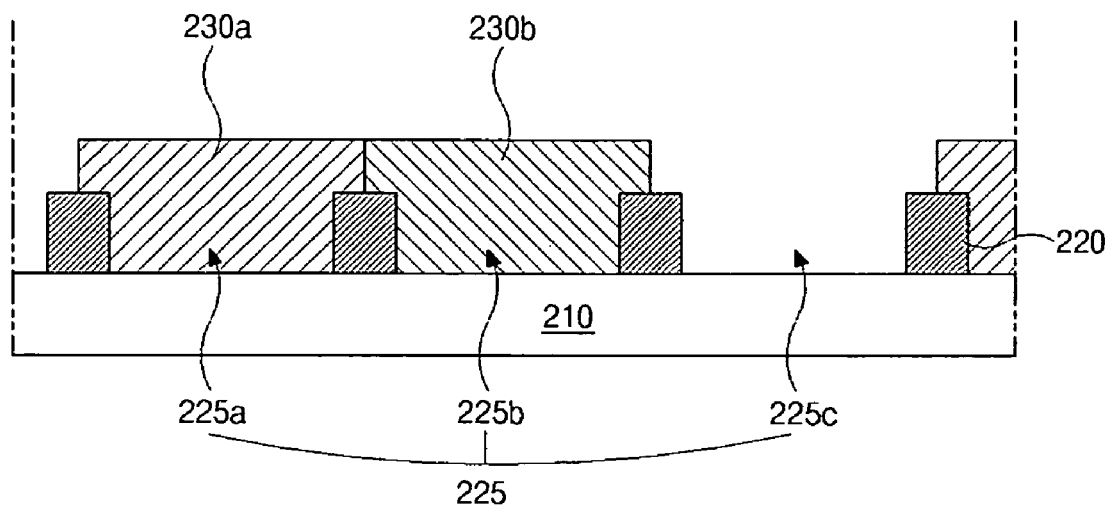
Figure 3E:
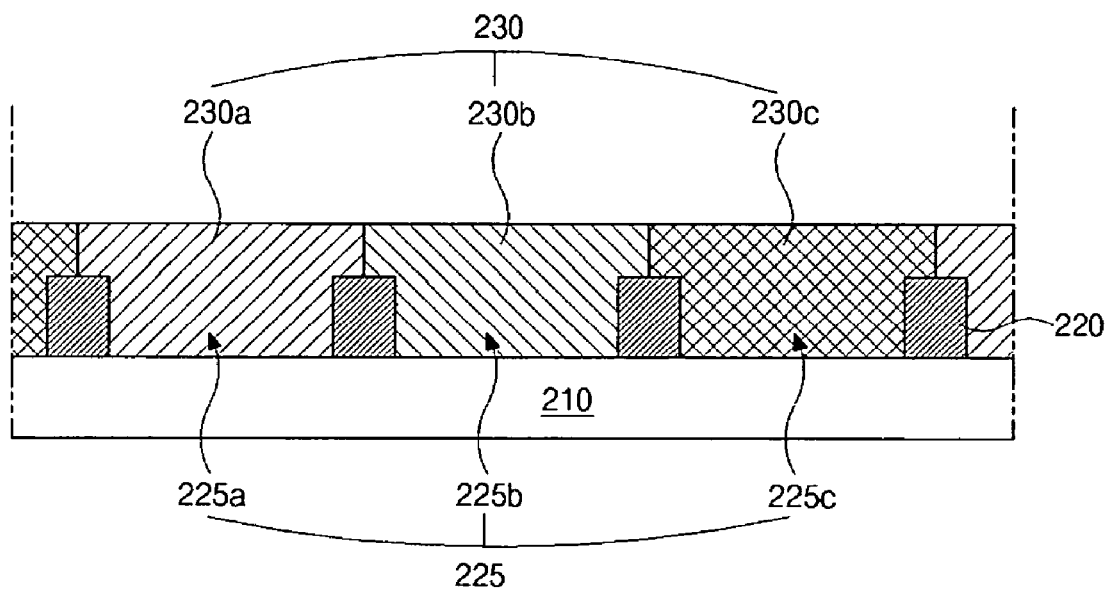
Figure 3F:
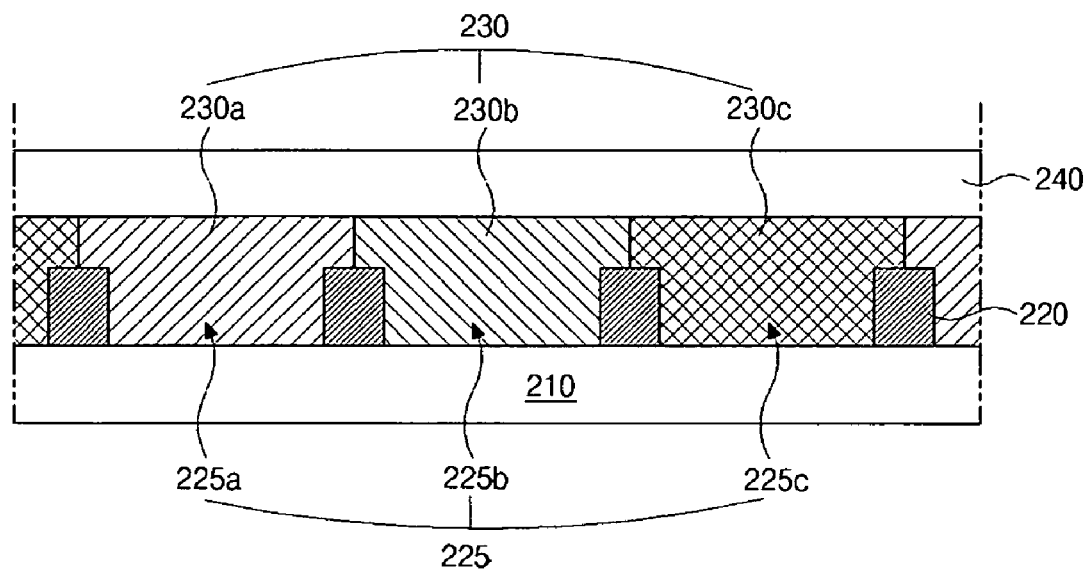
Figure 3G:
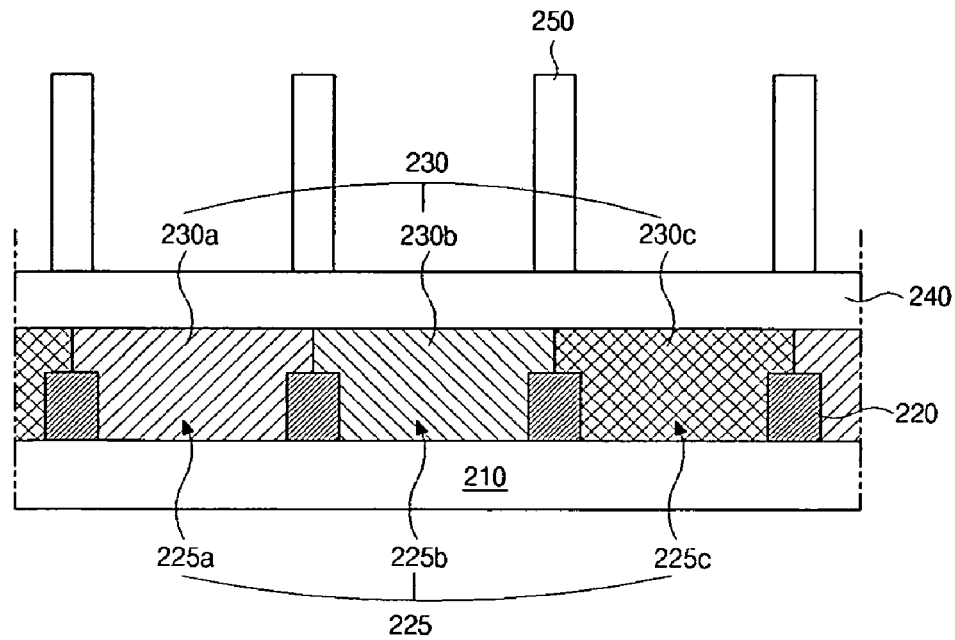
Figure 4:
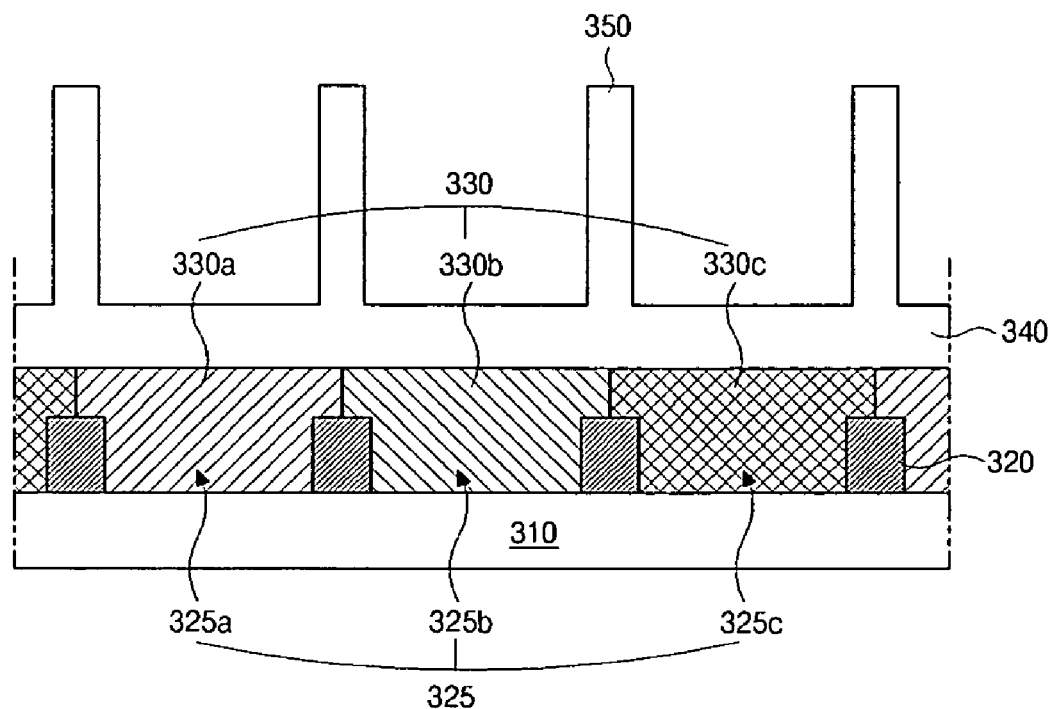
FIG. 4 is a cross-sectional view illustrating a substrate for a liquid crystal display device according to an embodiment of the present invention.

FIG. 4 is a cross-sectional view illustrating a substrate for a liquid crystal display device according to an embodiment of the present invention.

In FIG. 4, a black matrix 320 having an open portion 325 is formed on a substrate 310. A color filter layer 330 is formed on the black matrix 320. The color filter layer 330 includes red, green and blue sub-color filters 330a, 330b and 330c. In addition, an overcoat layer 340 is formed on an entire surface of the color filter layer 330, and a plurality of column spacers 350 are formed on the overcoat layer 340.

At this time, although not shown, the black matrix 320 is selected from light shielding materials. The black matrix 320 corresponds to a non-pixel region where a light leakage occurs because liquid crystal molecules are not driven as desired, such as portions of a gate line, a data line and a thin film transistor. Therefore, the black matrix 320 of a light shielding material should correspond to the non-pixel region in order to solve the light leakage problem.

The open portion 325 includes first to third sub-open portions 325a, 325b and 325c, and the red, green and blue sub-color filters 330a, 330b and 330c correspond to the first to third sub-open portions 325a, 325b and 325c, respectively. The red, green and blue sub-color filters 330a, 330b and 330c are selected from red, green and blue photosensitive materials, respectively. Although not shown, the open portion 325 corresponds to a pixel region, and each of first to third sub-open portions 325a, 325b and 325c corresponds to each of red, green and blue sub-pixel regions.

According to the present invention, the overcoat layer 340 and the column spacers 350 are simultaneously formed. The column spacers 350 are used for uniformly maintaining a cell gap that is defined by a thickness of a liquid crystal layer interposed between the substrate 310 and the other substrate facing the substrate although the facing substrate is not shown. The overcoat layer 340 and column spacers 350 are formed as a single body by a single process using the same material. For example, the overcoat layer 340 and the column spacers 350 are formed of a transparent organic material such as an acrylic resin based photosensitive material.

Hereinafter, an exemplary method for fabricating a substrate for a liquid crystal display device according to the present invention will be explained with reference to the accompanying drawings.

FIGS. 5A to 5I are cross-sectional views illustrating an exemplary method for fabricating a substrate for a liquid crystal display device according to the present invention.

Figure 5A:
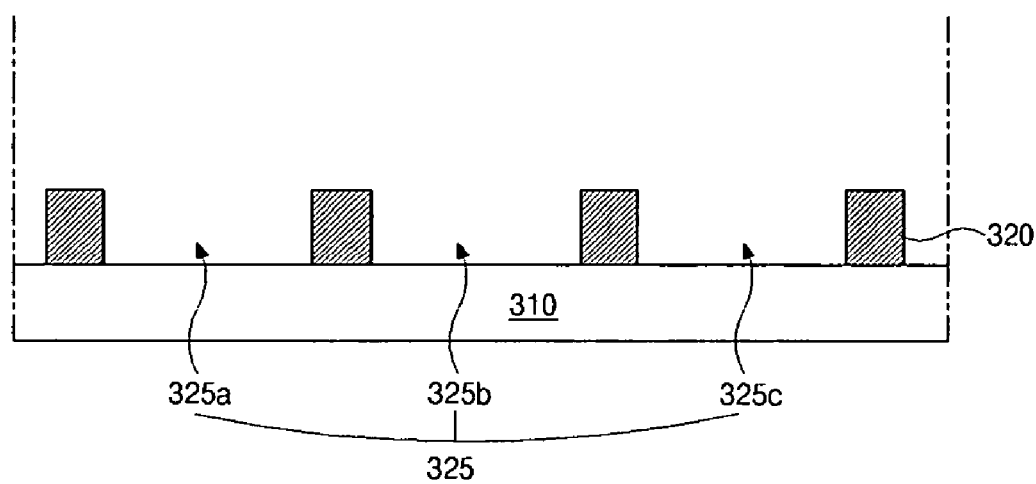
FIGS. 5A to 5I are cross-sectional views illustrating an exemplary method for fabricating a substrate for a liquid crystal display device according to the present invention.

In FIG. 5A, a black matrix 320 is formed by coating a light shielding material layer on a substrate 310 and by patterning the light shielding material using a patterning process such as a mask process, which includes exposure and developing processes. The black matrix 320 having first to third sub-open portions 325a, 325b and 325c are formed by the pattering process. Next, the black matrix 320 may be subject to a heat treatment for curing. The first to third sub-open portions 325a, 325b and 325c correspond to red, green and blue sub-pixel regions (not shown), respectively, and the black matrix 320 is located in a non-pixel region surrounding the pixel region. For example, the black matrix 320 may correspond to a region in which gate lines, data lines and thin film transistors are located.

Figure 5B:
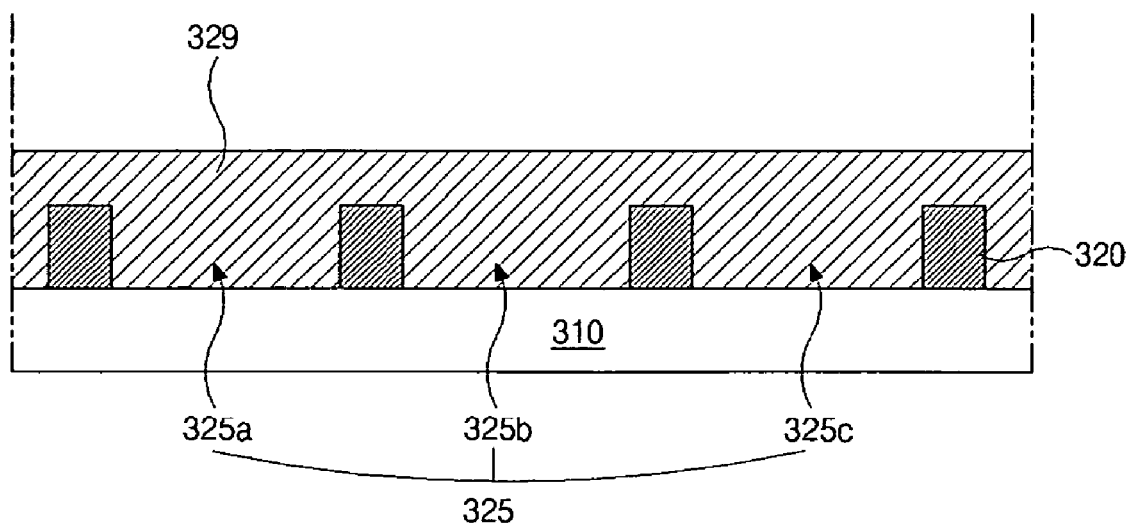

Next, in FIG. 5B, a red color resin layer 329 is coated over the substrate 310 having the black matrix 320. The red color resin layer 329 may be selected from photosensitive materials.

Figure 5C:
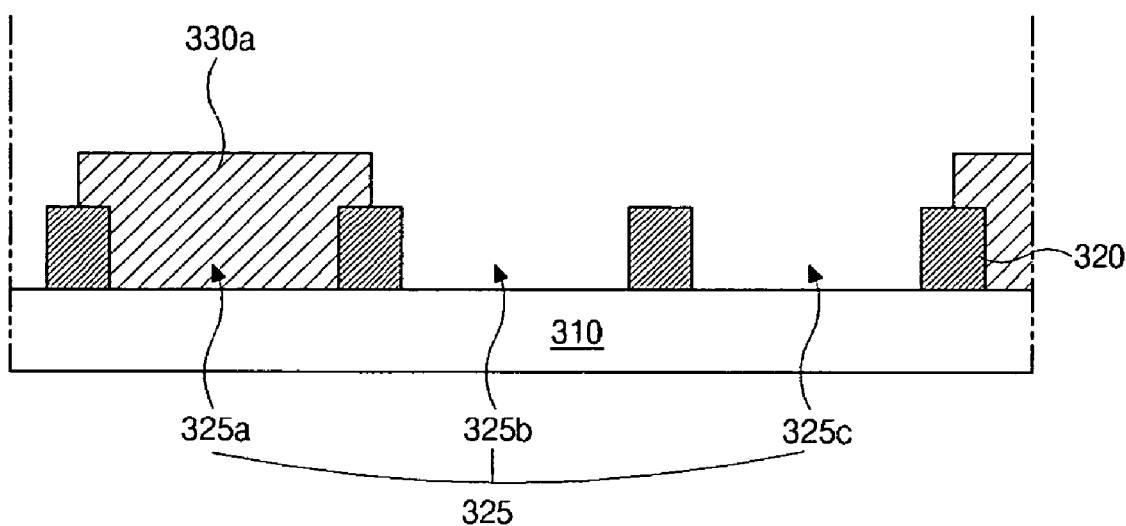

In FIG. 5C, the red color resin layer 329 of FIG. 5B is patterned into a red sub-color filter 330a in the first sub-open portion 325a, and then may be subject to a heat treatment for curing. The patterning step for the red sub-color filter 330a may be a mask process, which includes exposure and developing processes.

Photosensitive materials are classified into a positive type and a negative type. In case of the positive type, an exposed portion to light is removed after a developing process, and in case of the negative type, an exposed portion to light remains after a developing process.

When the red sub-color filter 330a is selected from positive-type photosensitive materials, the portion of the red resin material layer 329 of FIG. 5B corresponding to the first sub-open portion 325a is shielded from light during an exposure process and the other portions of the red resin material layer 329 are exposed to light. Although not shown, the exposure step may use a mask having a shielding portion and a transmitting portion. At this time, the shielding portion and the transmitting portion correspond to the first sub-open portion 325a and other sub-open portions 325b and 325c, respectively. The red sub-color filter 330a may be formed in the first sub-open portion 325a through such a mask process. In contrast, when the red resin material is selected from the negative-type materials, the portion of red resin material layer corresponding to the first sub-open portion 325a is exposed to light through the transmitting portion of the mask.

Figure 5D:
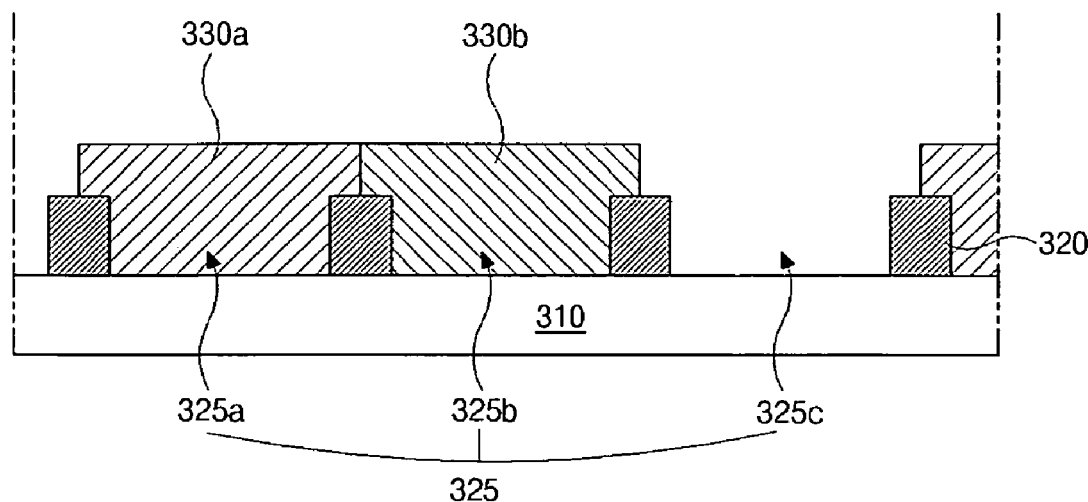

Next, in FIG. 5D, a green sub-color filter 330b is formed in the second sub-open portion 325b by coating a green resin material layer and patterning the green resin material using a patterning process such as a mask process.

Figure 5E:
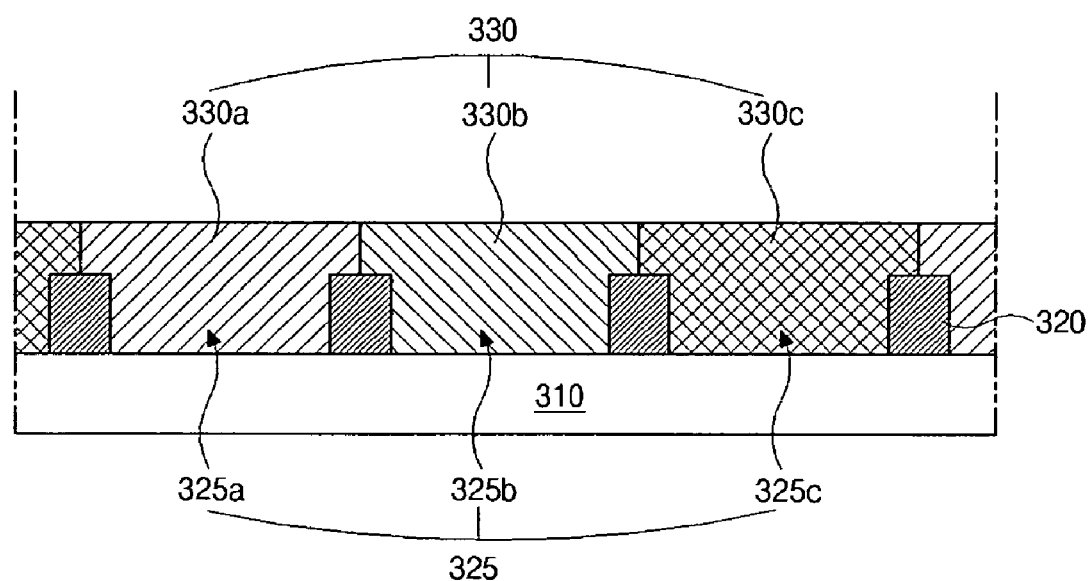

In FIG. 5E, a blue sub-color filter 330c is formed in the third sub-open portion 325c by coating a blue resin material layer and patterning the blue resin material using a patterning process such as a mask process.

Figure 5F:
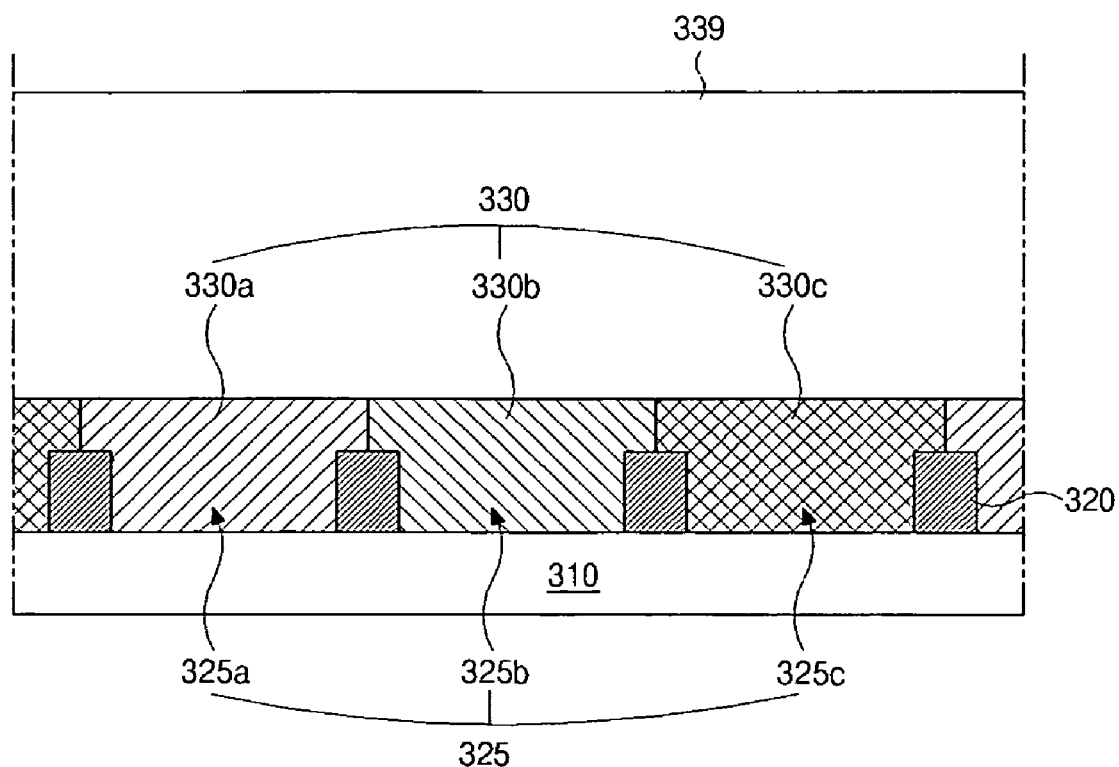

In FIG. 5F, a transparent photosensitive material layer 339 is coated on the color filter layer 330. At this time, the transparent photosensitive material layer 339 is selected from materials, of which transparent ratio for light is more than 95% and a degree of flatness is more than 60%. This transparent photosensitive material layer 339 may includes an acrylic resin based material. For example, the transparent photosensitive material 339 in FIG. 5F is selected from the negative type photosensitive materials.

Figure 5G:
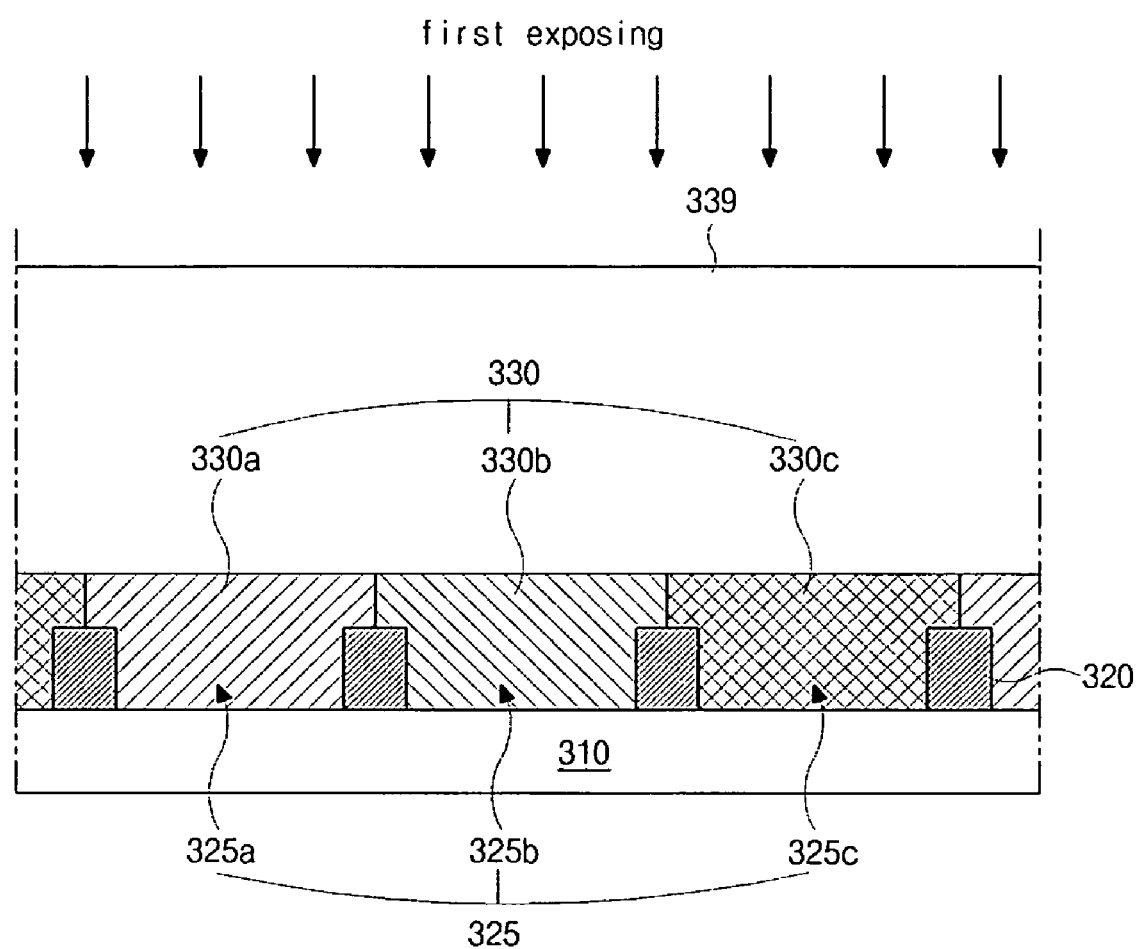

Next, in FIG. 5G, a first light is irradiated onto a surface of the transparent photosensitive material layer 339 without a mask ("first exposure"). At this time, the first light has an energy density of about 20% of the energy density of light that is used for a general exposure process. In addition, the transparent photosensitive material layer 339 is exposed so that its degree of uniformity is entirely less than about 5%. If the transparent photosensitive material 339 is not exposed uniformly, the transparent photosensitive material 339 exposed by the first light is developed with deviation of degrees of development so that a surface of an overcoat layer, which will be formed patterning the transparent photosensitive material 339, is not uniform. In addition, time for the exposure process with the first light may be determined by an optimum thickness of the overcoat layer after a developing process.

Figure 5H:
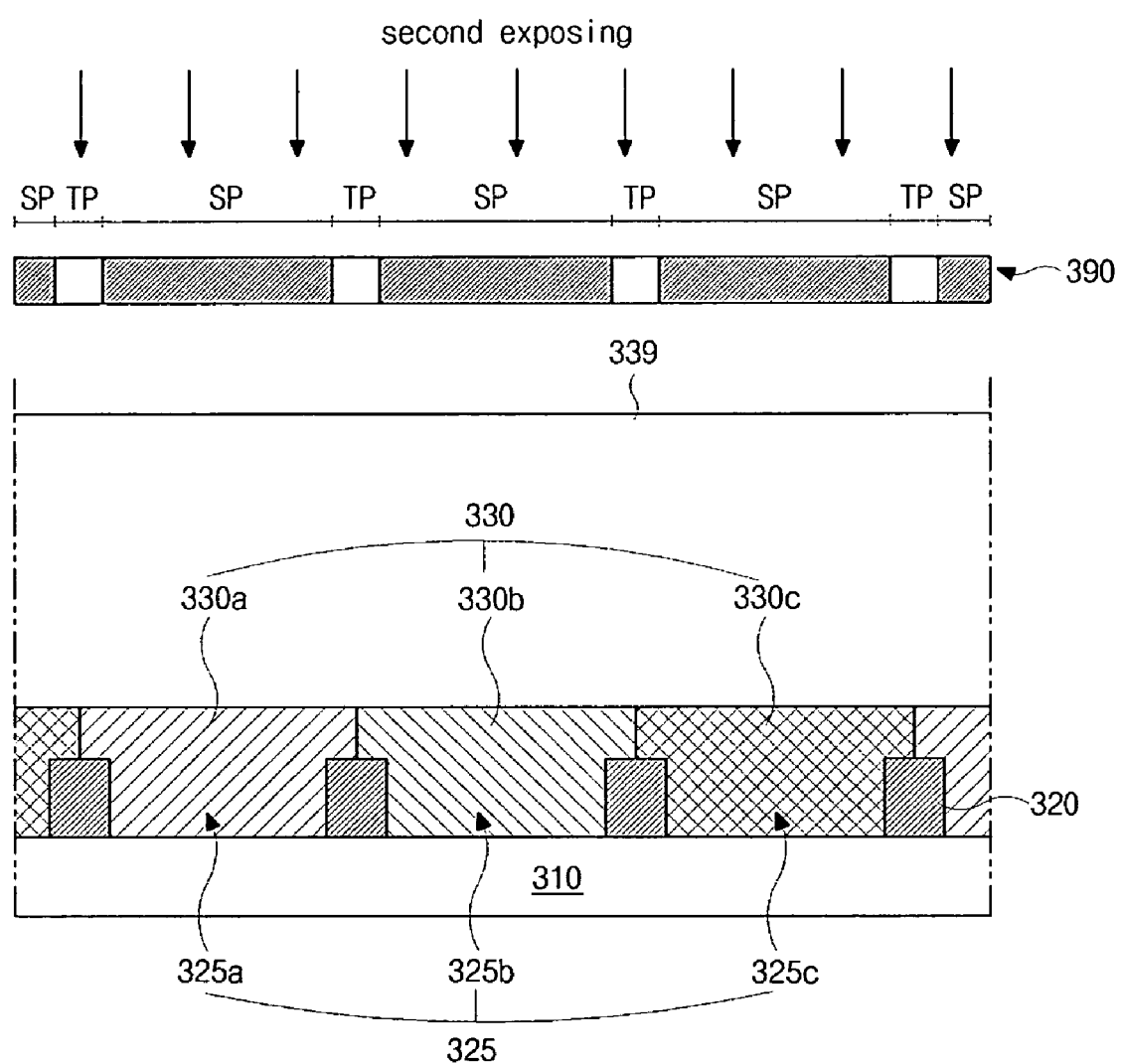

In FIG. 5H, a second light is then irradiated onto a surface of the transparent photosensitive material layer 339 through a mask 390 having a transmitting portion TP and a shielding portion SP ("second exposure"). At this time, an energy density of the second light is substantially the same as the light used for a general exposure process. Thus, the energy density of the first light is weaker than the energy density of the second light. In addition, the transmitting portions TP correspond to a portion of the transparent photosensitive material layer 339 that will be formed as column spacers. Thus, the portion of the transparent photosensitive material layer 339 that will be formed as column spacers is doubly exposed by the first and second lights.

Figure 5I:
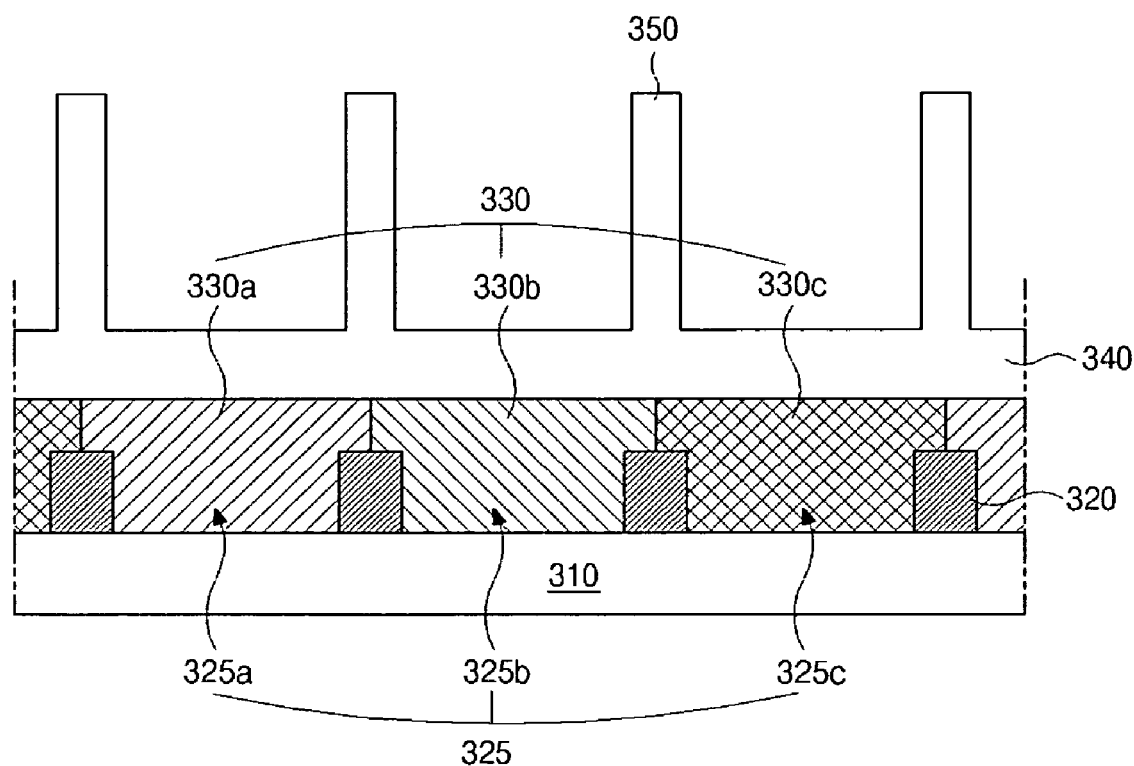

Next, in FIG. 5I, column spacers 350 and an overcoat layer 340 are simultaneously formed as a single body by developing the transparent photosensitive material layer 339. In addition, the column spacer 350 and the overcoat layer 340 may be subject to a heat treatment for curing. It should be appreciated that the column spacers 350 could be perpendicularly formed between the substrate surface and the sloped side of the column spacers 350 through the double exposure process.

Meanwhile, a liquid crystal display device is completed by attaching the substrate 310 to the other substrate and by providing liquid crystal therebetween.

As explained above, a liquid crystal display device according to the present invention, an overcoat layer and a plurality of column spacers are simultaneously formed by a single mask process. Therefore, the number of process steps for fabricating a liquid crystal display device can be reduced, thereby reducing the production cost. In addition, the column spacers have perpendicular sloped sides through the double exposure process, thereby uniformly maintaining a cell-gap.

It will be apparent to those skilled in the art that various modifications and variations can be made in the above-discussed display device and the driving method thereof without departing from the spirit or scope of the invention. Thus, it is intended that the present invention cover the modifications and variations of this invention provided they come within the scope of the appended claims and their equivalents.

What is claimed is:

1. A method for fabrication of a substrate for a liquid crystal display device, comprising:
   forming a color filter layer on a substrate;
   coating an organic layer on the color filter layer, the organic layer having a single-layered structure;
   irradiating a first light substantially onto an entire area of the organic layer to pattern the organic layer;
   irradiating a second light onto the organic layer through a mask having a transmitting portion and a shielding portion, an energy density of the first light smaller than an energy density of the second light, wherein a portion of the organic layer is doubly exposed by the first and second lights; and
   forming an overcoat layer and a column spacer by developing the organic layer,
   wherein the column spacer corresponds to the portion doubly exposed, and the overcoat layer is formed by partially removing the other portion singly exposed by the first light in the developing of the organic layer.

2. The method according to claim 1, further comprising forming a black matrix having an open portion on the substrate, the color filter layer in the open portion.

3. The method according to claim 1, wherein the organic layer includes a photosensitive material.

4. The method according to claim 3, wherein the photosensitive material is transparent.

5. The method according to claim 3, wherein the organic layer includes an acrylic resin based transparent photosensitive material.

6. The method according to claim 3, wherein the organic layer is a negative-type photosensitive material.

7. The method according to claim 1, wherein forming the color filter layer comprises: coating a color resin on the substrate; exposing the color resin layer to light; and developing the color resin layer.

8. The method according to claim 1, wherein forming the color filter layer includes forming red, green and blue sub-color filters on the substrate.

9. The method according to claim 1, further comprising curing the column spacer and the overcoat layer with heat after the step of irradiating the second light.

10. The method according to claim 1, wherein the step of irradiating the second light is performed after the step of irradiating the first light.

11. The method according to claim 1, wherein the overcoat layer and the column spacer are simultaneously formed.

12. The method according to claim 1, wherein the overcoat layer and the column spacer are formed after the step of irradiating the second light.

13. The method according to claim 1, wherein the energy density of the first light corresponds to about 20% of the energy density of the second light.

14. The method according to claim 1, wherein the step of irradiating the first light is performed without a mask.

* * * * *